United States Patent [19]

Scapellati

[11] Patent Number: 5,671,132
[45] Date of Patent: Sep. 23, 1997

[54] HIGH VOLTAGE BIPOLAR CT SCANNER POWER SUPPLY

[75] Inventor: Cliff Scapellati, Sayville, N.Y.

[73] Assignee: Spellman High Voltage Company, Hauppage, N.Y.

[21] Appl. No.: 614,996

[22] Filed: Mar. 13, 1996

[51] Int. Cl.[6] ........................ H02M 7/02
[52] U.S. Cl. .............. 363/63; 323/911; 363/69
[58] Field of Search ............... 363/63, 24–26, 363/69; 378/104, 114; 323/911

[56] References Cited

U.S. PATENT DOCUMENTS 4,488,214 12/1984 Chambers ........................... 363/71
4,614,999 9/1986 Onodera et al. ..................... 363/28
4,805,081 2/1989 Chambers .......................... 363/96
4,928,295 5/1990 Tanaka ............................. 378/104
5,202,932 4/1993 Cambier et al. ..................... 382/8

Primary Examiner—Peter S. Wong
Assistant Examiner—Shawn Riley
Attorney, Agent, or Firm—Gottlieb, Rackman & Reisman

[57] ABSTRACT

A bipolar high-voltage switching power supply system includes an input and a first output module for generating power at a first voltage and power rating. In another configuration, a second output module is combined with the first to generate power at double the power rating. The power supply is particularly suited for CT scanners and similar biomedical instrumentation.

10 Claims, 2 Drawing Sheets

HIGH VOLTAGE BIPOLAR CT SCANNER POWER SUPPLY

BACKGROUND OF THE INVENTION

A. Field of Invention

This invention pertains to a high voltage bipolar switching power supply particularly suited for CT scanners and the like, which can be built in several modules or subassemblies. The modules are arranged and constructed so that one set of these modules can be used to provide a preselected power level, while a subset of the assemblies can be used to supply a lower power level, with minor circuitry modifications.

B. Description of the Prior Art

Switching power supplies are used in a variety of applications to provide DC power at predetermined voltage and power levels. Typically these supplies include an input section connected to a line voltage supply and having a rectifier for rectifying the line voltage, an electronic high frequency inverter, and an output section for converting the output of the inverter to a desired voltage level. The output section further includes a rectifier bridge and smoothing filters to remove ripples.

A problem faced by manufacturers of these power supplies is that the end users may require power supplies having the same nominal output voltage having different power ratings. Sometimes a power supply with a higher power rating may be acceptable for a lower power rating application. However, in many instances, this is not an acceptable solution because of size, heat dissipation and cost considerations. Thus the manufacturers are frequently required to design and manufacture separate power supplies for each power rating requirement.

This problem is especially acute for CT scanners where space requirements are very important. Moreover, while it may appear initially that the best approach to solve the problem would be to provide two identical power supplies and hook them up in parallel. However, this solution is not acceptable in CT scanners, because it would require the use of at least one high voltage jumper between the individual power supply outputs. However, these jumpers are very expensive and require very large connectors (having a diameter of three or four inches).

OBJECTIVES AND SUMMARY OF THE INVENTION

In view of the above mentioned disadvantages of the prior art, it is an objective of the present invention to provide a modular bipolar high-voltage power supply wherein a plurality of modules can be used to form power supplies having different power ratings, some of the modules having substantially identical structures.

A further objective is to provide a bipolar high voltage power supply system which can be adapted easily to various power rating requirements.

Yet a further objective is to provide a power supply system which can be designed easily for various customer requirements and which sized and rated to match a customers requirements thereby reducing its cost, size and heat dissipation.

Other objectives and advantages of the invention shall become apparent from the following description. Briefly, a power supply system constructed in accordance with this invention includes an input module designed and constructed to receive an AC input and convert it to an intermediate output. The system further includes a first output module designed and constructed so that in a first configuration it takes the intermediate output of the input module, inverts it, steps it up, and rectifies it to generate a bipolar voltage a predetermined output voltage ±Vo and power rating P.

Importantly, for a higher power output application, the same input and first output modules are used in conjunction with a second output module. The first and second output modules are substantially identical. However, the output modules are modified to a second configuration different from the first configuration in that the rectifier portion of each module is arranged to provide two full wave of rectifier bridges, each bridge generating a unipolar output and cooperating to define bipolar output, of normal voltage ±Vo. In this manner one input module and one output module in a first configuration can be provided to generate an output at the nominal bipolar dc voltage ±Vo and the output power P. A similar input module, and two output modules in a second configuration can be provided to generate an output at a bipolar voltage ±Vo and power 2P.

DETAILED DESCRIPTION OF THE INVENTION

Figure 1:
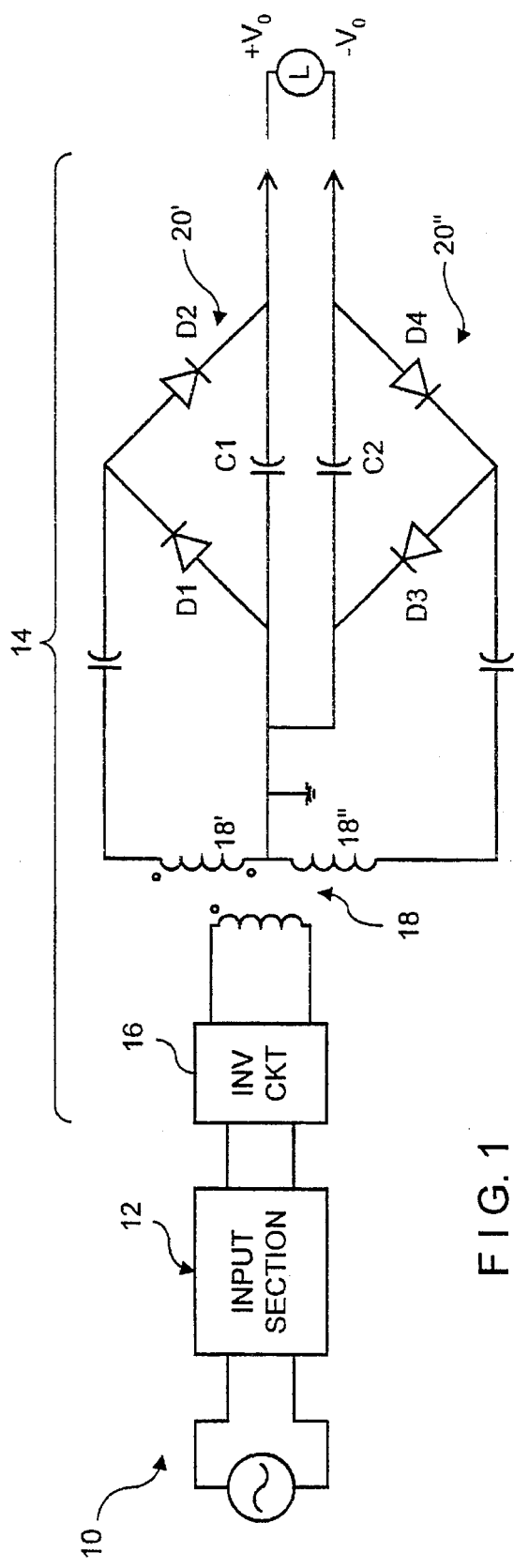
FIG. 1 shows an elementary circuit diagram for a power supply constructed in accordance with this invention to provide a low power output.

Referring now to FIG. 1, a power supply 10 includes an input module 12 and an output module 14. Input module 12 contains rectifying, filtering and control circuitry and is connected to an AC source 16. The input module rectifies the AC signal and generates an intermediate output. For example, input module 12 may generate an intermediate output of about 120 VDC. These functions are well known in the art and need not be described in any further detail. (See for instance, U.S. Pat. Nos. 4,488,214 and 4,805,081).

The output module 14 includes an inverter 16, a transformer 18 and two half rectifier bridges 20', 20". Transformer 18 has two secondary coils 18', 18", each feeding one of the half rectifier capacitor bridges 20', 20". The half bridges also include capacitors C1 and C2 respectively. Half bridges 20', 20" are composed of diodes D1, D2, D3 and D4 arranged as shown. The bipolar outputs ±Vo, of the module 14 are delivered on lines 22, 24 to a load L. The modules 12 and 14 may be constructed and sized to form, for example, a nominal 24 KW power supply to deliver for example to load L 70K volts DC at 200 mA.

In order to provide a different power supply 10A having the same voltage but double the power rating, the input modules 12A, 12B and two modules 14A, 14B are provided. Modules 12A, 12B are similar to module 12. Modules 14A and 14B are similar to the module 14. More particularly, each has an inverter circuit 16A, 16B, a transformer 18A, 18B. Importantly, the diodes of the half bridge rectifiers 20', 20" are now rearranged as shown to form respectively two full wave rectifiers 20A and 20B. Rectifier 20A is formed of diodes D1A–D4A, and capacitor C1A. Rectifier 20B is formed of diodes D1B–D4B and capacitor C1B. Diodes D1A–D4A, D1B–D4B are identical to diodes D1–D4 respectively, except that the orientation of some of the diodes have been reversed as shown. Capacitors C1A, C1B represent the parallel combinations of capacitors C1, C2. In this new arrangement, load L1 receives a voltage +Vo from output module 14A and a voltage −Vo (with respect to ground) from output module 14B. L1 may be, for example, a CT scanner.

Figure 2:
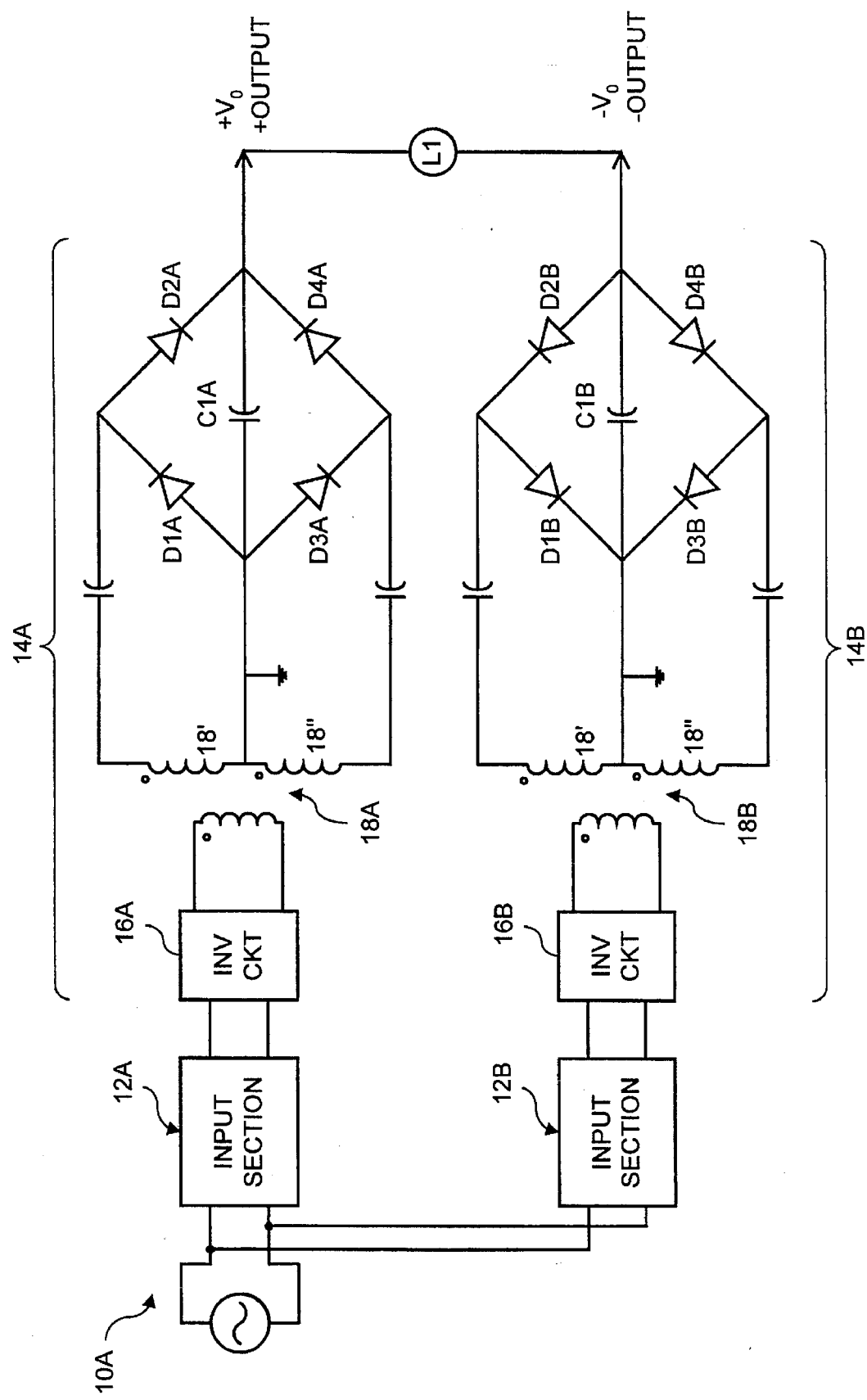
FIG. 2 shows an elementary circuit diagram for a power supply constructed in accordance with this invention to provide a high power output.

In this manner a nominal 48 KW power supply is formed to deliver a bipolar ±70 Kvolts DC at a maximum of 400 mA using the modules 12A, 12B, 14A, 14B. Importantly the main modification between the configurations of FIGS. 1 and 2 is the orientation of the diodes as described. In addition, some of the control logic may have to be changed as well, if required.

Figure 3:
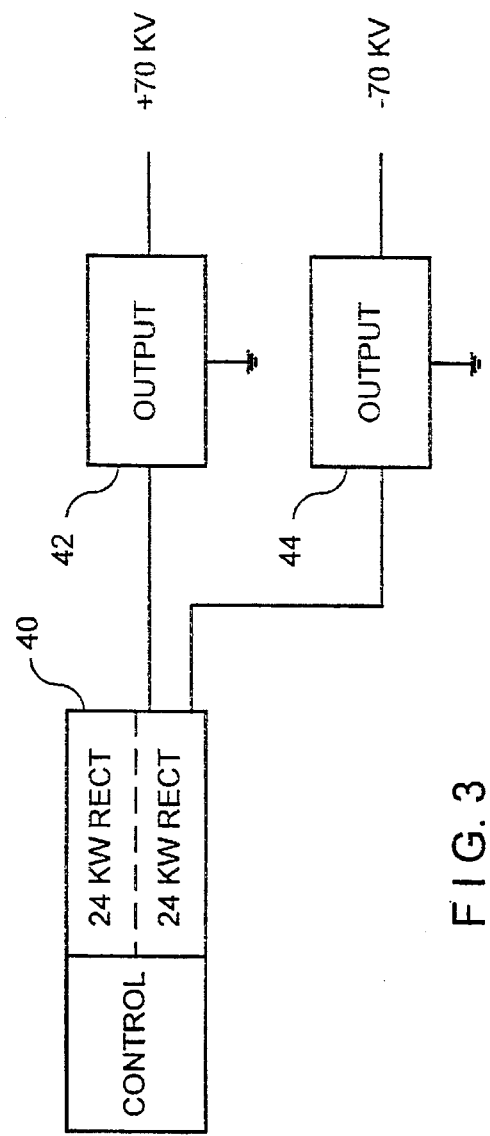
FIG. 3 shows a block diagram for a bipolar power supply for a CT scanner constructed in accordance with this invention.

Referring to FIG. 3, power supply 10 may be constructed of two modules 40 and 42, with module 40 containing the input section 12 and module 42 containing the output section 14.

In order to construct power supply 10A, a common case 40 may be used to house both input modules 12A, 12B. This arrangement is advantageous because the control circuitry may be shared for these input modules. Thus, for a nominal bipolar ±70 KV, 400 mA power supply, the case 40 could contain control circuitry and two 24 KW rectifier/filtering subassemblies. The intermediate outputs therefrom, are fed to two cases 42 and 44. Cases 42 and 44 contain output sections 14A, 14B respectively, and generate outputs +70 KV, and −70 KV, as shown.

Although the invention has been described with reference to several particular embodiments, it is to be understood that these embodiments are merely illustrative of the application of the principles of the invention. Accordingly, the embodiments described in particular should be considered exemplary, not limiting, with respect to the following claims.

I claim:

1. A bipolar high-voltage power supply system comprising:
    an input module for connection to a line voltage for generating intermediate power; and
    an output module for receiving said intermediate power and generating in response an output power of a predetermined nominal value P, said output module including a plurality of diodes arranged in one of a first configuration wherein said diodes generate a bipolar output of nominal voltage ±Vo, or a second configuration in which said diodes define a unipolar output of +Vo or −Vo;
    wherein said input module and said output module with said diodes in said first configuration define a first power supply; and
    wherein said first input modules and two output modules having said diodes arranged in said second configurations cooperate to define a second power supply having a different power rating than said first power supply.

2. The system of claim 1 wherein said first power supply has a nominal power rating of P and said second power supply has a nominal power rating of 2P.

3. The system of claim 1 wherein the diodes of each said output modules cooperate to define a full wave rectifier bridge.

4. A modular bipolar high-voltage power supply system comprising:
    an input module receiving an AC input and generating an intermediate output;
    a first and a second output module, each receiving said intermediate output and having a first configuration and a second configuration, wherein in said first configuration said first output module generates a bipolar output of a nominal voltage ±V and power rating P; and
    wherein in said second configuration said first output module cooperates with said second output module to form a power supply having a nominal power rating 2P, each said output modules generating a unipolar output of +V or −V.

5. The power supply system of claim 4 wherein output modules each include, a transformer and a plurality of diodes, said diodes having a first configuration in which they define a pair of half-wave rectifier bridges, and a second configuration in which said diodes form a full wave rectifier.

6. The power supply system of claim 1 wherein said first and second power supplies each have a nominal bipolar output of ±Vo volts.

7. The power supply system of claim 1 wherein output module has a first bipolar and a second bipolar output terminal in said first configuration and has only a single unipolar output terminal in said second configuration.

8. The power supply system of claim 7 wherein said first power supp.ufl ly has a pair of first power supply output terminals defined by said bipolar output terminals and wherein said second power supply has a pair of second power supply output terminals, each being defined by one of the unipolar output terminals.

9. The power supply system of claim 1 wherein at least one of said diodes is inverted between said first and second configurations.

10. The power supply system of claim 1 wherein in said first configuration of said output modules, said diodes define a first full wave bridge for each of said output modules; and wherein in said second configuration of said output modules, the diodes of the first output module cooperate with the diodes of the second output module to define a second full wave bridge but said diodes do not form a full wave bridge internally within each of said modules.

* * * * *